United States Patent [19]
Komori

[11] Patent Number: 5,572,414
[45] Date of Patent: Nov. 5, 1996

[54] HIGH VOLTAGE POWER SUPPLY CIRCUIT

[75] Inventor: Chihiro Komori, Tokyo, Japan

[73] Assignee: Oki Electric Industry Co., Ltd., Tokyo, Japan

[21] Appl. No.: 314,504

[22] Filed: Sep. 28, 1994

[30] Foreign Application Priority Data

Oct. 4, 1993 [JP] Japan .................... 5-247824

[51] Int. Cl.⁶ .................................................. H02M 3/18
[52] U.S. Cl. ............................................................ 363/60
[58] Field of Search ............................ 363/59, 60, 61; 323/222, 282

[56] References Cited

U.S. PATENT DOCUMENTS

| | | | |
|---|---|---|---|
| 3,828,239 | 8/1974 | Nagai et al. | 321/2 |
| 4,636,709 | 1/1987 | Ohsawa | 323/267 |
| 4,999,566 | 3/1991 | Kuehn | 323/222 |
| 5,027,266 | 6/1991 | Ishii et al. | 363/60 |
| 5,034,875 | 7/1991 | Hattori | 363/60 |

FOREIGN PATENT DOCUMENTS

| | | |
|---|---|---|
| 0044663 | 1/1982 | European Pat. Off. . |
| 3427820 | 2/1985 | Germany . |
| 63-64571 | 3/1988 | Japan . |

*Primary Examiner*—Matthew V. Nguyen
*Attorney, Agent, or Firm*—Law Office of Steven M. Rabin, P.C.

[57] ABSTRACT

There is provided a resonant circuit incorporating at least a coil L1 therein and a switching circuit for oscillation is connected to the resonant circuit and voltage doubler rectifier circuits 31 and 32 including capacitors C11, C12, C21 and C22 and diodes D11, D12, D21 and D22 are also connected to the resonant circuit. When the switching circuit for oscillation is turned on and off, the resonant voltage $V_{L1}$ is generated in the resonant circuit and rectified with a voltage doubler amplitude by the voltage doubler rectifier circuits 31 and 32. A switching circuit for output changing over is connected to zero voltage terminals of the diodes D11 and D21 in the voltage doubler rectifier circuits 31 and 32. When the switching circuit for output changing over is turned on and off, an output voltage is selectively generated at output terminals OUT1 and OUT2.

27 Claims, 6 Drawing Sheets

HIGH VOLTAGE POWER SUPPLY CIRCUIT

REFERENCE TO RELATED APPLICATION

This application claims the priority right under 35 U.S.C. 119 of Japanese Patent Application No. Hei 05-247824 filed on Oct. 4, 1993, the entire disclosure of which is incorporated herein by reference.

BACKGROUND OF THE INVENTION

1. Field of the Invention

The present invention relates to a high voltage power supply circuit for alternately changing between a positive and negative output.

2. Description of the Related Art

A conventional high voltage power supply circuit for changing between a positive or negative output employs both transistors for both positive and negative outputs and the positive and negative outputs are achieved by either transistor being selectively turned on or off.

The conventional high voltage power supply circuit has incorporated thereinto two transformers, one each for positive and negative outputs. There are disposed switching transistors at the respective primary windings of each transformer which are selectively turned on and off.

There are also disposed rectifier circuits consisting of a diode and a capacitor at the respective secondary windings of each transformer. Each rectifier circuit, in which the diode is connected such that the polarity is the opposite of the other, provides a positive or a negative output through an output terminal in response to turning on or off of the switching transistors.

This kind of high voltage power supply circuit employs a load resistor in a circuit providing a negative output to avoid the influence that circuit would have when a connected circuit providing a positive output generates a positive output, and on the contrary, a load resistor in the circuit providing a positive output to avoid the influence from the connected circuit providing a positive output when the circuit for a negative output generates a negative output. Accordingly, since output current flows through the load resistor, the output voltage will decrease when the output current increases so that the output load characteristic (regulation) of the high voltage power supply circuit is unstable.

To solve the above problem, there are provided, in the conventional high voltage power supply circuit, resistors between the rectifier circuit and the output terminal which divide the output voltage and the divided voltage is fed back to a control circuit which turns the switching transistors on or off. Accordingly, the output voltage should be regulated by controlling pulse widths provided to the transistors, which makes the high voltage power supply circuit complicated and large, thereby increasing the cost.

There also has been proposed a high voltage power supply circuit which avoids the inconsistency of the output load characteristic and eliminates the load resistors on the positive and negative outputs. The proposed high voltage power supply circuit is constructed such that the rectifier circuits providing the circuits for positive and negative outputs are connected through switches to the output terminal to eliminate the mutual influence of each circuit when a signal is provided at the output.

According to the above technology, no output current flows through the load resistor so that the output load characteristic is stable.

However, the use of a relay for switching between the positive and negative outputs is required, so that the high voltage power supply circuit becomes large and complicated, which increases the cost.

Further, since each of the foregoing technologies requires a plurality of the transformers to have a winding direction corresponding to the output polarity and also requires transformers for a high voltage, the high voltage power supply circuit will become complicated and large, thereby increasing the cost.

There is also disclosed, for example, in a Japanese Laid-open Patent Publication 63-64571 a high voltage generation device which does not utilize a transformer and does not employ a load resistor. However, the above device is principally a circuit for obtaining an output voltage having more than n-time voltages by using a voltage n-multiplier rectifier circuit, so it cannot perform the operation for changing over from positive to negative or vice versa. Accordingly, the above technology is completely different from the present invention in its circuit function and principle so that it cannot be utilized as a high voltage power supply circuit for an electro photographic printer or the like which requires a switching function.

SUMMARY OF THE INVENTION

It is an object of the present invention to provide a high voltage power supply circuit, the output load characteristic of which is stable, for enabling the circuit to be miniaturized easily and for enabling a reduction in cost.

To accomplish the above object, there is provided a high voltage power supply circuit comprising: (a) a resonant circuit employing at least a coil; (b) a switching circuit for oscillation connected to the resonant circuit; (c) a voltage multiplier rectifier circuit constituted of a capacitor and a diode and connected to the resonant circuit; and (d) a switching circuit for changing over an output connected to a zero voltage terminal of the diode in the voltage multiplier rectifier circuit.

According to another aspect of the present invention, there is provided a high voltage power supply circuit which outputs a positive or negative voltage, the circuit comprising: (a) a resonant circuit employing at least a coil; (b) a switching circuit for oscillation connected to the resonant circuit; (c) a first voltage multiplier rectifier circuit connected to the resonant circuit and constituted of a capacitor and a diode connected in such a manner that current flows from a ground to a first output terminal; (d) a second voltage multiplier rectifier circuit connected to the resonant circuit and constituted of a capacitor and a diode connected in such a manner that current flows from a second output terminal to a ground; (e) a first switching circuit for changing over an output connected to a zero voltage terminal of the diode in the first voltage multiplier rectifier circuit; and (f) a second switching circuit for changing over an output connected to a zero voltage terminal of the diode in the second voltage multiplier rectifier circuit.

According to the other aspect of the present invention, there is provided a high voltage power supply circuit which outputs a positive or negative voltage, the circuit comprising: (a) a first resonant circuit employing at least a coil; (b) a first switching circuit for oscillation connected to the first resonant circuit; (c) a first voltage multiplier rectifier circuit connected to the first resonant circuit and constituted of a capacitor and a diode connected in such a manner that current flows a ground to a first output terminal; (d) a first switching circuit for changing over an output connected to a zero voltage terminal of the diode in the first voltage multiplier rectifier circuit; (e) a second resonant circuit employing at least a coil; (f) a second switching circuit for oscillation connected to the second resonant circuit; (g) a second voltage multiplier rectifier circuit connected to the second resonant circuit and constituted of a capacitor and a diode connected in such a manner that current flows from a second output terminal to the ground; and (h) a second switching circuit for changing over an output connected to a zero voltage terminal of the diode in the second voltage multiplier rectifier circuit.

According to still another aspect of the present invention, there is provided a high voltage power supply circuit which outputs a positive or negative voltage at an output terminal thereof, the circuit comprising: (a) a resonant circuit employing at least a coil; (b) a switching circuit for oscillation connected to the resonant circuit; (c) a first voltage multiplier rectifier circuit connected to the resonant circuit and constituted of a capacitor and a diode connected in such a manner that current flows a ground to the output terminal; (d) a second voltage multiplier rectifier circuit connected to the resonant circuit and constituted of a capacitor and a diode connected in such a manner that current flows from the output terminal to the ground; (e) a first switching circuit for changing over an output connected to a zero voltage terminal of the diode in the first voltage multiplier rectifier circuit; and (f) a second switching circuit for changing over an output connected to a zero voltage terminal of the diode in the second voltage multiplier rectifier circuit.

According to the present invention, a high voltage power supply circuit includes a resonant circuit employing at least a coil therein to which a switching circuit for oscillation and the double voltage rectifier circuit including a capacitor and a diode are respectively connected. Accordingly, a resonant voltage is generated in the resonant circuit by turning the switching circuit on or off for oscillation and is rectified by the double voltage rectifier circuit.

The switching circuit for switching an output is connected to the zero voltage electrode of the diode of the double voltage rectifier circuit. An output is selectively generated at the output terminal by turning the switching circuit on or off.

According to another high voltage power supply circuit of the present invention, there are provided a plurality of double voltage rectifier circuits, the output terminals of which are commonly connected. In this case, both a positive output and a negative output can be generated at the common output terminal.

BRIEF DESCRIPTION OF DRAWINGS

By way of example and to make the description more clear, reference is made to the accompanying drawings in which.

DETAILED DESCRIPTION OF THE PREFERRED EMBODIMENTS

A detailed description as to embodiments according to the present invention will be made in reference to the attached drawings.

Figure 1:
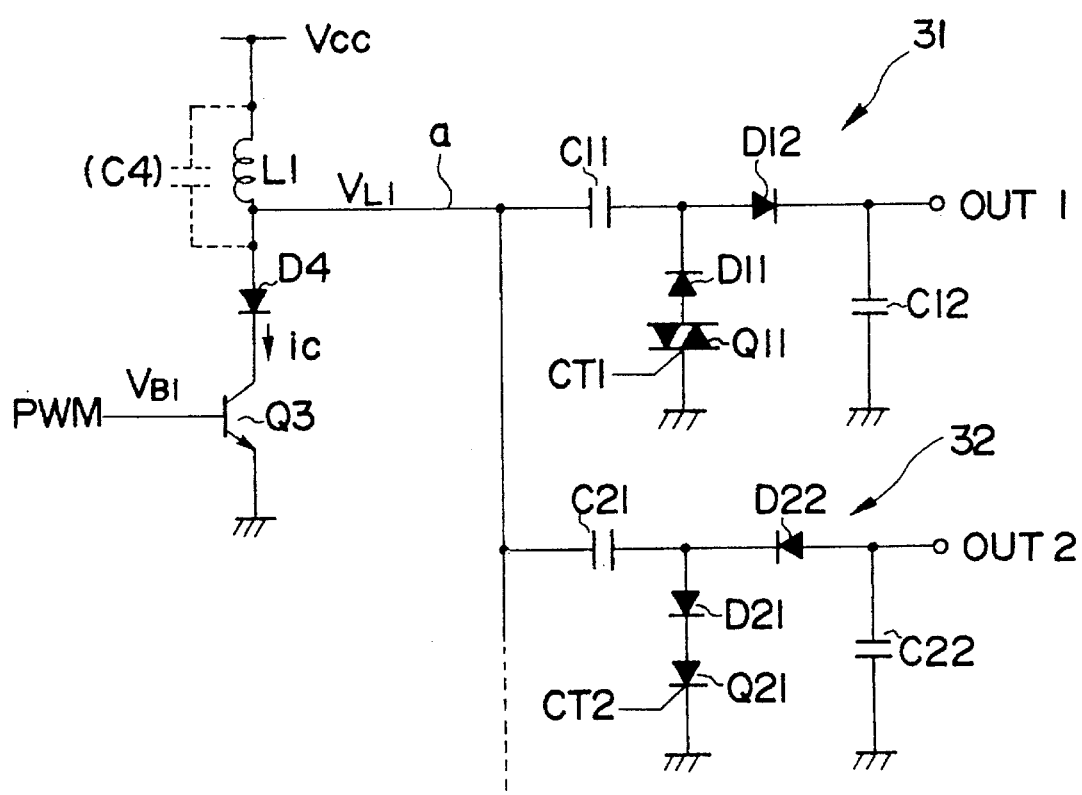
FIG. 1 is a circuit diagram illustrating a high voltage power supply circuit according to the first embodiment of the present invention.
Figure 2:
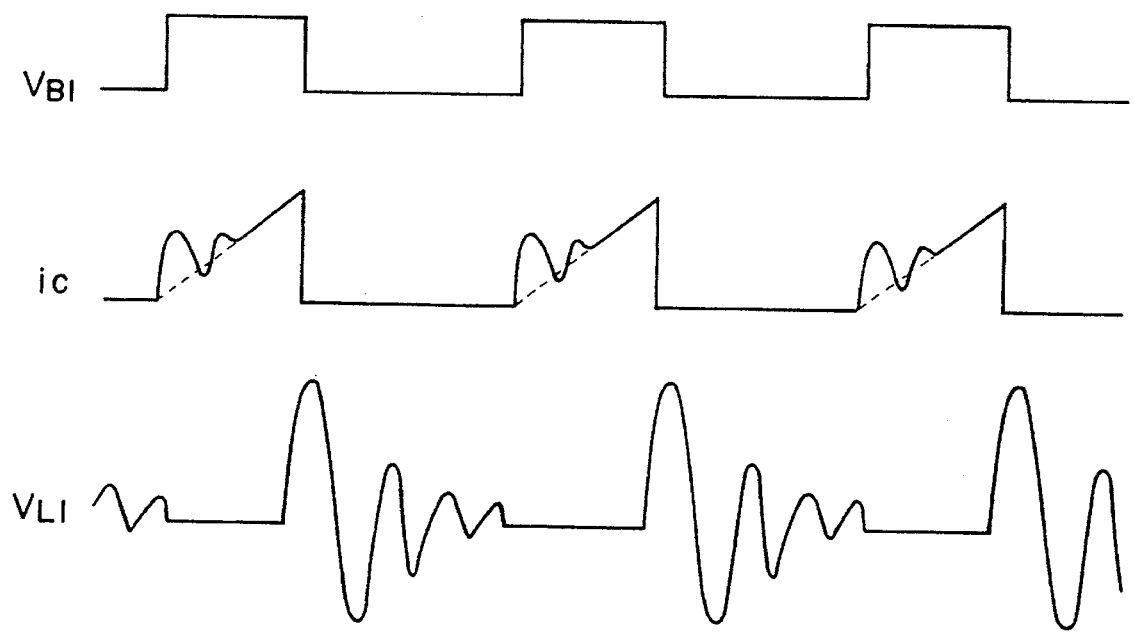
FIG. 2 is a time chart of the high voltage power supply circuit shown in FIG. 1 according to the first embodiment of the present invention.

FIG. 1 is a circuit diagram illustrating a high voltage power supply circuit according to the first embodiment of the present invention and FIG. 2 is a time chart for the high voltage power supply circuit according to the first embodiment of the present invention.

In the drawing, a reference L1 denotes a coil, D4 a diode, and Q3 a transistor serving as a switching circuit for oscillation. The coil L1, the diode D4 and the transistor Q3 are connected in series between the power source and ground. A capacitor C4 is connected in parallel with the coil L1 to constitute a resonant circuit.

A pulse width modulation signal PWM is provided to the base of the transistor Q3. If the level of a base voltage $V_{B1}$ generated by the pulse width modulation signal PWM varies as shown in FIG. 2, the transistor Q3 repeatedly turns on and off.

In other words, when the transistor Q3 turns on, a collector current $i_c$ gradually increases, while charging the capacitor C4, satisfying the following formula:

$$i_c = (Vcc/L) \cdot t$$

wherein Vcc denotes the voltage of the voltage source Vcc; L an inductance of the coil L1; and t a time. In this case, just after the transistor Q3 turns on, the collector current $i_c$ has been influenced by the resonant current, as shown in FIG. 2, caused by the resonant voltage $V_{L1}$ which appears during an off period of the transistor Q3.

Consequently, when the transistor Q3 turns off, the resonant voltage $V_{L1}$ is generated in the resonant circuit by an energy stored in the coil L1. In this instance, the resonant voltage $V_{L1}$ swings in both positive and negative directions. Accordingly, the diode D4 is disposed in order not to apply a negative voltage to the transistor Q3.

A voltage doubler rectifier circuit 31 for a positive output and a voltage doubler rectifier circuit 32 for a negative output are mutually connected in parallel with each other between the coil L1 and the diode D4.

The voltage doubler rectifier circuit 31 includes a capacitor C11 connected to an input junction line a, a diode D11 connected to a zero voltage terminal (ground side) of the capacitor C11, a triac Q11 connected to a zero voltage terminal of the diode D11 and serving as the first switching circuit for output changing over, a diode D12 connected between the capacitor C11 and the diode D11, and a capacitor C12 connected to a zero voltage terminal of the diode D12. The output terminal OUT1 is connected between the diode D12 and the capacitor C12. The diodes D11 and D12 are connected in such a manner that current flows from ground to the output terminal OUT1.

On the other hand, the voltage doubler rectifier circuit 32 includes a capacitor C21 connected to the input junction line a, a diode D21 connected to the zero voltage terminal of the capacitor C21, a thyristor Q21 connected to the zero voltage terminal of the diode D21 and serving as the second switching circuit for output changing over, a diode D22 wired between the capacitor C21 and the diode D21, and a capacitor C22 connected to the zero voltage electrode of the diode D22. An output terminal OUT2 is wired between the diode D22 and the capacitor C22. The diodes D21 and D22 are connected in such a manner that current flows from the output terminal OUT2 to ground.

Other voltage doubler rectifier circuits (not shown) having different output levels can further be connected in parallel with the voltage doubler rectifier circuits 31 and 32. And instead of each of the voltage doubler rectifier circuits 31 and 32, a voltage multiplier rectifier circuit can be easily formed by connecting plural sets of a diode and a capacitor in series. Moreover, a switching element such as a transistor, an FET or the like can be utilized as the first or the second switching circuit for output changing over.

The resonant voltage $V_{L1}$ generated in the resonant circuit consisting of the coil L1 and the capacitor C4 is provided through the junction line a to the voltage doubler rectifier circuit 31 and 32, and rectified with a voltage doubler amplitude in the voltage doubler rectifier circuits 31 and 32 so that a positive output voltage is generated at the output terminal OUT1 in the case of the voltage doubler rectifier circuit 31 and a negative output voltage is generated at the output terminal OUT2 in the case of the voltage doubler rectifier circuit 32.

Although the coil L1 and the capacitor C4 constitute the resonant circuit, the capacitor C4 may be omitted because the coil L1 has a distributed capacitance and the coil L1 is connected to the capacitors C11 and C21.

Assuming that the sum of the capacitance of the capacitors C4, C11 and C21 is C and a collector current $i_c$ is $i_{C0}$ when the transistor Q3 is in an off state, a peak voltage $V_{L1peak}$ of the resonant voltage $V_{L1}$ can satisfy the following formula 1.

$$V_{L1peak} = \sqrt{\frac{L}{C}} \cdot i_{C0}. \tag{1}$$

A peak value $i_{C0peak}$ of the collector current $i_c$ can be calculated using the following formula, wherein an expensive air-cored coil having 2 [mH] in inductance L is employed as the coil L1, the voltage Vcc of the power supply source Vcc is 5 [V] and the pulse width modulation signal PWM is a rectangular wave having a frequency of 5 [kHz] and a duty cycle of ½.

$$\begin{aligned} i_{C0peak} &= (5/2 \times 10^{-3}) \times (1/5 \times 10^3) \times 1/2 \\ &= 0.25 [A] \\ &= 250 [mA] \end{aligned}$$

If the sum C of the capacitance is 800 [pF], the peak voltage $V_{L1peak}$ of the resonant voltage $V_{L1}$ satisfies the following formula 2.

$$V_{L1peak} = \sqrt{\frac{2 \times 10^{-3}}{800 \times 10^{-2}}} \times 0.25 = 395.3 \tag{2}$$

The peak voltage $V_{L1peak}$ is further doubled by the voltage doubler rectifier circuits 31 and 32.

As described above, an output voltage having approximately 800 [V] in amplitude can be generated without employing a large and expensive transformer.

The voltage doubler rectifier circuit 31 can be operated by providing a control signal CT1 to the triac Q11 whereas the voltage doubler rectifier circuit 32 can be operated by providing a control signal CT2 to the thyristor Q21.

In other words, if the control signals CT1 and CT2 are not provided, the triac Q11 and the thyristor Q21 turn off so that the voltage applied to either one of the terminals of the diodes D11 and D21 cannot be determined to be 0 [V], thereby causing an anode terminal of the diode D11 and a cathode terminal of the diode D21 to be open-ended. Accordingly, potential voltages at the terminals connected to the diodes D11 and D21 of the capacitors C11 and C21 cannot be determined so that no output voltage is generated at the output terminals OUT1 and OUT2.

Figure 3:
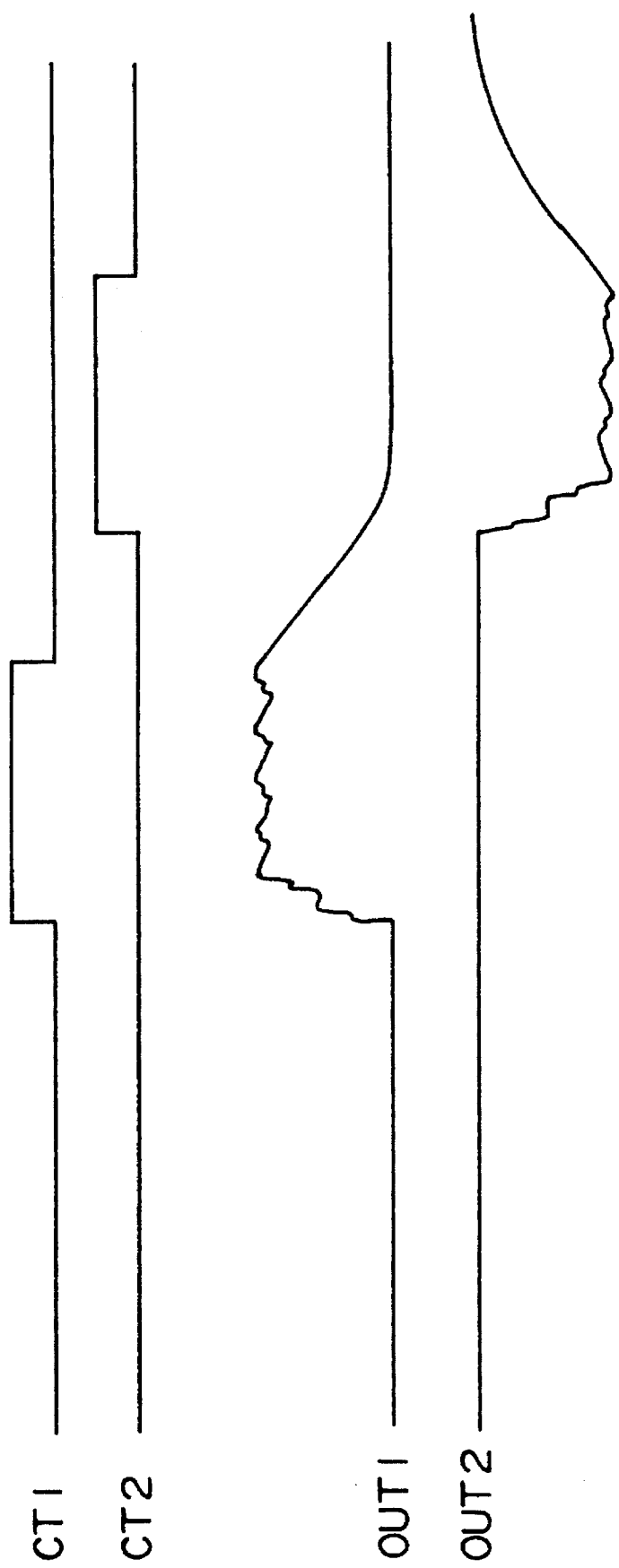
FIG. 3 is a time chart illustrating an output control operation of the high voltage power supply circuit shown in FIG. 1 according to the first embodiment of the present invention.

FIG. 3 shows an output control operation time chart for the high voltage power supply circuit shown in FIG. 1. If neither signal CT1 and CT2 is provided, neither output voltage OUT1 nor OUT2 is generated.

When the signal CT1 is provided, the transistor Q11 turns on, the anode terminal of the diode D11 is grounded, the voltage doubler rectifier circuit 31 is operated and the positive output voltage is produced at the output terminal OUT1. Similarly, when the signal CT2 is provided, the voltage doubler rectifier circuit 32 is operated so that the negative produced voltage is output at the output terminal OUT2.

As described above, presence or absence of the output generated at the output terminals OUT1 and OUT2 is controlled by turning the triac Q11 and the thyristor Q21 on or off.

By the way, a device in which a high voltage power supply circuit of this kind is incorporated, such as an electro photographic printer, is usually controlled by a microcomputer, so that a control voltage having +5 [V] has been generated. Accordingly, if the microcomputer generates the control signals CT1 and CT2, no signal transmission means, such as a photo coupler, an insulating transformer or the like, is required any more so the high voltage power supply circuit can be simplified.

Since the present embodiment is constructed such that a positive output voltage is generated at the output terminal OUT1 of the voltage doubler rectifier circuit 31 and a negative output voltage is generated at the output terminal OUT2 of the voltage doubler rectifier circuit 32, the switching circuit for the voltage doubler rectifier circuit 31 receives the negative output voltage whereas the switching means for the voltage doubler rectifier circuit 32 receives the positive output voltage if both switching means are provided in each of the voltage doubler rectifier circuits 31 and 32.

Accordingly, as described above, the triac Q11 is utilized as the first switching circuit for output switching and the thyristor Q21 is utilized as the second switching circuit, so that the triac Q11 is controlled to be turned on or off by the control signal CT1 with a positive polarity and the thyristor Q21 is controlled to be turned on or off by the control signal CT2 with a positive polarity. Further, a high voltage tolerance of the voltage doubler rectifier circuits 31 and 32 can be also improved by employing the triac Q11 and the thyristor Q21.

As the thyristor Q21 used, as the second switching circuit and having a sufficiently high access speed for switching, is employed, a reverse current can be prevented during a switching operation. Accordingly, a resonant frequency of the resonant circuit may allow the diode D21 to be omitted so that further simplification of the high voltage power supply circuit can be realized.

Next, the second embodiment according to the present invention will be described.

Figure 4:
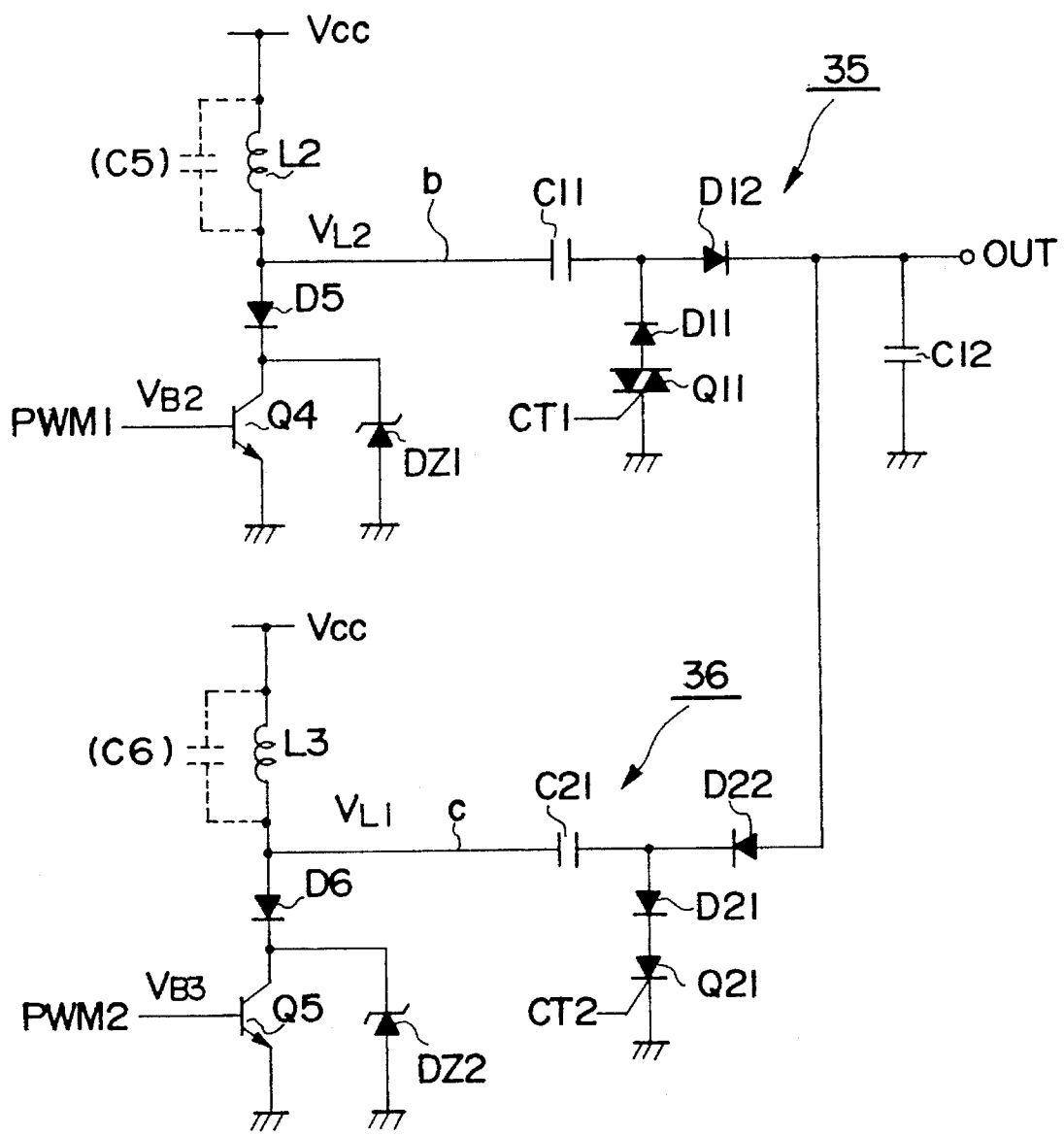
FIG. 4 is a circuit diagram illustrating a high voltage power supply circuit according to the second embodiment of the present invention.
Figure 5:
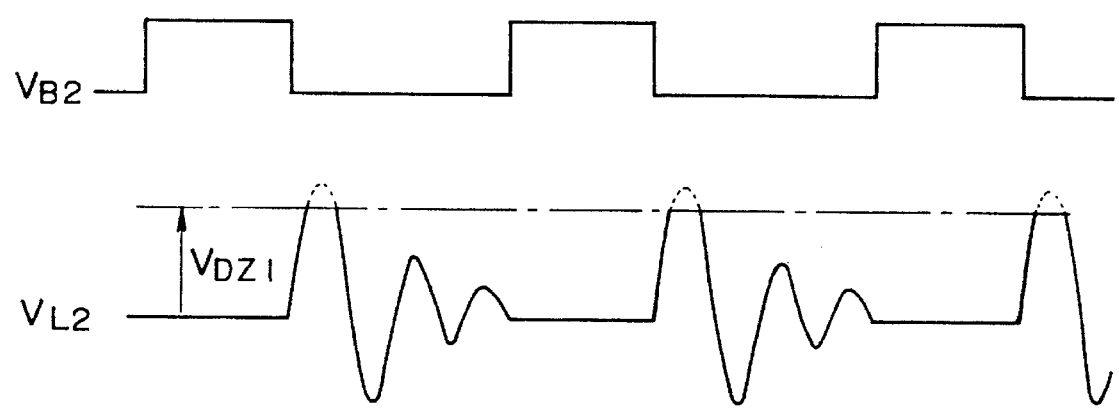
FIG. 5 is a time chart of the high voltage power supply circuit shown in FIG. 4 according to the second embodiment of the present invention.

FIG. 4 is a circuit diagram illustrating the high voltage power supply circuit according to the second embodiment of the present invention and FIG. 5 is a time chart of the high voltage power supply circuit according to the second embodiment of the present invention.

In FIG. 4, L2 and L3 denote coils, D5 and D6 diodes, Q4 a transistor for the first switching circuit for oscillation, and Q5 a transistor for the second switching means for oscillation. The coil L2, the diode D5 and the transistor Q4, and the coil L3, the diode D6 and the transistor Q5 are connected respectively in series between the power source Vcc and the ground. Capacitors C5 and C6 are respectively connected with the coils L2 and L3 in parallel to constitute resonant circuits. Further, a Zener diode DZ1 is connected between a collector and an emitter of the transistor Q4 and a Zener diode DZ2 is connected between a collector and an emitter of the transistor Q5.

When the pulse width modulation signal PWM1 is provided to the transistor Q4 and the voltage level of the base voltage $V_{B2}$ generated by the pulse width modulation signal PWM1 varies, the transistor Q4 is repeatedly turned on and off. On the other hand, when the pulse width modulation signal PWM2 is provided to the transistor Q5 and the voltage level of the base voltage $V_{B3}$ generated by the pulse width modulation signal PWM2 varies, the transistor Q5 is repeatedly turned on and off.

A voltage doubler rectifier circuit 35 for a positive output is connected in parallel between the coil L2 and the diode D5, and a voltage doubler rectifier circuit 36 for a negative output is connected in parallel between the coil L3 and the diode D6. In this case, both output terminals of the voltage doubler rectifier circuits 35 and 36 may be wired-OR connected so that the output is generated at the common output terminal OUT.

The voltage doubler rectifier circuit 35 comprises a capacitor C11 connected to an input junction line b, a diode D11 connected to a zero voltage terminal of the capacitor C11, a triac Q11 connected to a zero voltage terminal of the diode D11 and which serves as the first switching circuit for output changing over, a diode D12 connected between the capacitor C11 and the diode D11, and a capacitor C12, connected to a zero voltage terminal of the diode D12, for a positive output and a negative output. The common output terminal OUT for both positive and negative outputs is connected between the diode D12 and the capacitor C12. The diodes D11 and D12 are connected in such a manner that current flows from ground to the output terminal OUT.

On the other hand, the voltage doubler rectifier circuit 36 is comprises a capacitor C21 connected to the input junction line c, a diode D21 connected to the zero voltage terminal of the capacitor C21, a thyristor Q2 connected to the zero voltage terminal of the diode D21 and which serves as the second switching circuit for output changing over, a diode D22 wired between the capacitor C21 and the diode D21, and a capacitor C12 connected to the zero voltage electrode of the diode D22. An output terminal OUT2 is wired between the diode D22 and the capacitor C12. The diodes D21 and D22 are connected in such a manner that current flows from the common output terminal OUT to ground.

Other voltage doubler rectifier circuits (not shown) having different output levels can further be connected in parallel with the voltage doubler rectifier circuits 35 and 36. And instead of each of the voltage doubler rectifier circuits 35 and 36, a voltage multiplier rectifier circuit can be easily formed by connecting plural sets of a diode and a capacitor in series. Moreover, a switching element such as a transistor, an FET or the like can be utilized as the first or the second switching circuit for output changing over.

The voltage doubler rectifier circuit 35 can be operated by providing the control signal CT1 into the triac Q11 and the voltage doubler rectifier circuit 36 can be operated by providing the control signal CT2 into the thyristor Q21.

In this case, the Zener diodes DZ1 and DZ2 are respectively connected between collectors and emitters of the transistors Q4 and Q5 so that the output voltage is stabilized. For example, the resonant voltage $V_{L2}$ generated by the resonant circuit for a positive output has peak voltage that is by the Zener diode DZ1 so that the Zener voltage $V_{DZ1}$ becomes the peak value as shown in FIG. 5.

As described above, the capacitors C11 and C21 are charged in the voltage doubler rectifier circuits 35 and 36, until the time when the resonant voltages $V_{L1}$ and $V_{L2}$ reach the peak voltages so that the output is stabilized due to clamping of the peak voltage. If timings and pulse widths of the pulse width modulation signals PWM1 and PWM2 are determined in such a manner that an energy corresponding to the maximum value of the output power appearing at the output terminal OUT can be stored in the coils L2 and L3, waveforms of the pulse width modulation signals PWM1 and PWM2 can be fixed, eliminating a complicated control circuit or a detecting circuit for an output.

The output voltage generated at the output terminal OUT is approximately twice as the Zener voltage $V_{DZ1}$. The output voltage can be optionally set by setting the Zener voltages $V_{DZ1}$ and $V_{DZ2}$ of the Zener diodes DZ1 and DZ2.

Further, the voltage doubler rectifier circuits 35 and 36 employ the common capacitor C12 for positive and negative outputs and the output terminal OUT so that the output with an optional polarity can be generated at the output terminal OUT. In other words, when the triac Q11 is turned on and the thyristor Q21 off, a positive output voltage can be generated at the output terminal OUT whereas when the triac Q11 is turned off and the thyristor Q21 on, a negative output voltage can be generated at the output terminal OUT. Moreover, since there are provided the diodes D11, D12, D21 and D22, no short circuit occurs in the voltage doubler rectifier circuits 35 and 36 with an opposite polarity. Further, since a direct current flow is stopped by the capacitors C11 and C21, no short circuit occurs through the capacitors C11 and C21.

Next, a third embodiment of the present invention is described.

Figure 6:
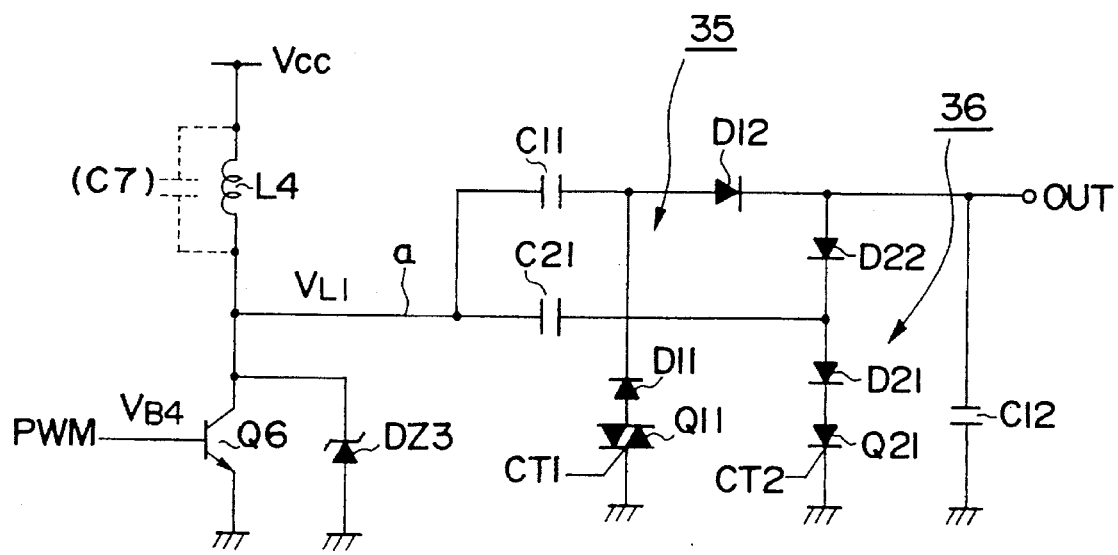
FIG. 6 is a circuit diagram illustrating a high voltage power supply circuit according to the third embodiment of the present invention.

FIG. 6 is a circuit diagram illustrating a high voltage power supply circuit according to the third embodiment of the present invention.

In the drawing, L4 denotes a coil and Q6 denotes a transistor for a switching circuit for oscillation. The coil L4 and the transistor Q6 are connected in series between the power source Vcc and the ground. A capacitor C7 is connected in parallel with the coil L4 to constitute a resonant circuit. A Zener diode DZ3 is connected between the collector and the emitter of the transistor Q6.

The transistor Q6 receives the pulse width modulation signal PWM. When the voltage level of the base voltage $V_{B4}$ generated by the pulse width modulation signal PWM varies, the transistor Q6 is repeatedly turned on and off.

Double voltage rectifier circuits 35 and 36 are connected in parallel between the coil L4 and the transistor Q6. In this case, output terminals of the voltage doubler rectifier circuits 35 and 36 are wired-OR connected so as to generate an output voltage at the common output terminal OUT.

The voltage doubler rectifier circuit 35 comprises a capacitor C11 connected to an input junction line a, a diode D11 connected to a zero voltage terminal of the capacitor C11, a triac Q11, connected to a zero voltage terminal of the diode D11, which serves as the first switching circuit for output changing over, a diode D12 connected between the capacitor C11 and the diode D11 and a common capacitor C12, connected to a zero voltage terminal of the diode D12, for positive and negative outputs. The common output terminal OUT for both positive and negative outputs is connected between the diode D12 and the capacitor C12. The diodes D11 and D12 are connected in such a manner that current flows from ground to the output terminal OUT.

On the other hand, the voltage doubler rectifier circuit 36 comprises a capacitor C21 connected to an input junction line a, a diode D21 connected to a zero voltage terminal of the capacitor C21, a thyristor Q21, connected to a zero voltage terminal of the diode D21, which serves as the second switching circuit for output changing over, a diode D22 connected between the capacitor C21 and the diode D21 and a common capacitor C12, connected to a zero voltage terminal of the diode D22, for positive and negative outputs. The common output terminal OUT for both positive and negative outputs is connected between the diode D22 and the capacitor C12. The diodes D21 and D22 are connected in such a manner that current flows from the output terminal OUT to ground.

$V_{L1}$ denotes a resonant voltage, and CT1 and CT2 control signals.

In this case, the output voltage generated at the output terminal OUT by the voltage doubler rectifier circuit 35 is equal to that generated by the voltage doubler rectifier circuit 36 and only polarities can be changed. In other words, when the triac Q11 is turned on and the thyristor Q21 off, a positive output voltage can be generated at the output terminal OUT and when the triac Q11 is turned off and the thyristor Q21 on, a negative output voltage can be generated at the output terminal OUT.

It will be noted that the present invention is not restricted or limited to the aforementioned embodiments, as various changes and modifications can be done in accordance with a gist of the present invention, and such changes and modifications are not precluded from the claimed scope of the present invention. For example, a high voltage power supply circuit in which only one voltage doubler rectifier circuit is provided is also included in the claimed scope of the present invention.

The present invention is also applicable to a device which requires a power supply circuit, output of which can switch from positive to negative or vice versa, and particularly, to an electro photographic printer, a copier, a plane paper facsimile or the like.

As described above, there are provided in a high voltage power supply circuit according to the present invention a resonant circuit having at least a coil, a switching circuit for oscillation connected to the resonant circuit and a voltage doubler rectifier circuit including a capacitor and a diode which is also connected to the resonant circuit. Accordingly, when the switching circuit for oscillation is turned on and off, a resonant voltage is generated in the resonant circuit and rectified with a voltage doubler value by the voltage doubler rectifier circuit.

A switching circuit for output changing over is connected to a zero voltage terminal of a diode in the voltage doubler rectifier circuit. When the switching circuit for output changing over is controlled to be turned on and off, an output voltage is selectively generated at the output terminal. Accordingly, the voltage doubler rectifier circuits for both positive and negative outputs can be wired without a through resistor so that output load characteristics of the high voltage power supply circuit will be stable.

Moreover, even though the output current increases, the output voltage does not decrease so that the pulse width of the switching means for oscillation is not necessarily altered. There is also no need to dispose a relay or the like so that miniaturization and cost reduction can be easily accomplished by simplifying the high voltage power supply circuit.

It is understood that although the present invention has been described in detail with respect to preferred embodiments thereof, various other embodiments and variations are apparent to those skilled in the art which fall within the scope and spirit of the invention, and such other embodiments and variations are intended to be covered by the following claims.

What is claimed is:

1. A high voltage power supply circuit comprising:
   (a) a resonant circuit including at least a coil;
   (b) a first switching circuit for oscillation connected to the resonant circuit;
   (c) a voltage multiplier rectifier circuit comprising a capacitor and a diode and connected to the resonant circuit; and
   (d) a second switching circuit for changing an output, connected to a zero voltage terminal of the diode.

2. A high voltage power supply circuit as set forth in claim 1, wherein the voltage multiplier rectifier circuit is provided plurally and the second switching circuit is also provided plurally.

3. A high voltage power supply circuit which produces a positive or negative voltage, the circuit comprising:
   (a) a resonant circuit including at least a coil;
   (b) an input switching circuit for oscillation connected to the resonant circuit;
   (c) a first voltage multiplier rectifier circuit, connected to the resonant circuit and comprising a first capacitor and a first diode connected in such a manner that current flows from ground to a first output terminal when a control signal is applied thereto;
   (d) a second voltage multiplier rectifier circuit, connected to the resonant circuit and comprising a second capacitor and a second diode connected in such a manner that current flows from a second output terminal to ground when a control signal is applied thereto;
   (e) a first output switching circuit for changing an output, connected to a zero voltage terminal of the first diode; and
   (f) a second output switching circuit for changing an output, connected to a zero voltage terminal of the second diode.

4. A high voltage power supply circuit as set forth in claim 3, wherein the first output switching circuit is a triac.

5. A high voltage power supply circuit as set forth in claim 3, wherein the second output switching circuit is a thyristor.

6. A high voltage power supply circuit as set forth in claim 3, wherein the first and second output switching circuits are selected from the group consisting of a transistor and a field effect transistor.

7. A high voltage power supply circuit as set forth in claim 3, wherein the first output terminal and the second output terminal are common.

8. A high voltage power supply circuit as set forth in claim 3, wherein the circuit is applied to a power supply circuit for an electro photographic printer.

9. A high voltage power supply circuit as set forth in claim 3, wherein the circuit is applied to a power supply circuit for a copier.

10. A high voltage power supply circuit as set forth in claim 3, wherein the circuit is applied to a power supply circuit for a plain paper facsimile device.

11. A high voltage power supply circuit which produces a positive or negative voltage, the circuit comprising:

(a) a first resonant circuit including at least a first coil;

(b) a first input switching circuit for oscillation connected to the first resonant circuit;

(c) a first voltage multiplier rectifier circuit, connected to the first resonant circuit and comprising a first capacitor and a first diode connected in such a manner that current flows from ground to a first output terminal when a control signal is applied thereto;

(d) a first output switching circuit for changing an output, connected to a zero voltage terminal of the first diode;

(e) a second resonant circuit including at least a second coil;

(f) a second input switching circuit for oscillation connected to the second resonant circuit;

(g) a second voltage multiplier rectifier circuit, connected to the second resonant circuit and comprising a second capacitor and a second diode connected in such a manner that current flows from a second output terminal to ground when a control signal is applied thereto; and (h) a second output switching circuit for changing an output, connected to a zero voltage terminal of the second diode.

12. A high voltage power supply circuit as set forth in claim 11, wherein the fist output terminal and the second output terminal are common.

13. A high voltage power supply circuit as set forth in claim 11, wherein the first input switching circuit is connected in parallel with a first Zener diode which sets a peak positive output voltage and the second input switching circuit is connected in parallel with a second Zener diode which sets a peak negative output voltage.

14. A high voltage power supply circuit as set forth in claim 11, wherein the circuit is applied to a power supply circuit for an electro photographic printer.

15. A high voltage power supply circuit as set forth in claim 11, wherein the circuit is applied to a power supply circuit for a copier.

16. A high voltage power supply circuit as set forth in claim 11, wherein the circuit is applied to a power supply circuit for a plain paper facsimile device.

17. A high voltage power supply circuit which produces a positive or negative voltage at an output terminal thereof, the circuit comprising:

(a) a resonant circuit including at least a coil;

(b) an input switching circuit for oscillation connected to the resonant circuit;

(c) a first voltage multiplier rectifier circuit, connected to the resonant circuit and comprising a first capacitor and a first diode connected in such a manner that current flows from ground to the output terminal when a control signal is applied thereto;

(d) a second voltage multiplier rectifier circuit, connected to the resonant circuit and comprising a second capacitor and a second diode connected in such a manner that current flows from the output terminal to the ground when a control signal is applied thereto;

(e) a first output switching circuit for changing a first output, connected to a zero voltage terminal of the first diode; and (f) a second output switching circuit for changing a second output, connected to a zero voltage terminal of the second diode.

18. A high voltage power supply circuit as set forth in claim 17, wherein the input switching circuit is connected in parallel with a Zener diode which sets a peak output voltage.

19. A high voltage power supply circuit as set forth in claim 17, wherein the first output switching circuit is a triac and the second output switching circuit is a thyristor.

20. A high voltage power supply circuit as set forth in claim 17, wherein the circuit is applied to a power supply circuit for an electro photographic printer.

21. A high voltage power supply circuit as set forth in claim 17, wherein the circuit is applied to a power supply circuit for a copier.

22. A high voltage power supply circuit as set forth in claim 17, wherein the circuit is applied to a power supply circuit for a plain paper facsimile device.

23. A power supply circuit comprising:

(a) a resonant element for providing a periodic signal;

(b) input switch means, responsive to the periodic signal for producing a resonant voltage;

(c) voltage multiplier rectifier means, including a capacitor and a diode, the diode having a zero voltage terminal, for rectifying the resonant voltage to provide an output signal having a polarity; and (d) output switch means, connected to the zero voltage terminal, for changing the polarity of the output level.

24. The power supply circuit of claim 23, further comprising a Zener diode connected in parallel with the input switch means for setting a peak resonant voltage.

25. The power supply circuit set forth in claim 23, wherein:

the voltage multiplier rectifier means comprises a first voltage multiplier rectifier circuit for rectifying the resonant voltage to provide a first output signal, and a second voltage multiplier rectifier circuit for rectifying the resonant voltage to provide a second output signal;

the first voltage multiplier rectifier circuit comprises a first capacitor and a first diode, the first diode having a first zero voltage terminal;

the second voltage multiplier rectifier circuit comprises a second capacitor and a second diode, the second diode having a second zero voltage terminal; and the output switch means comprises a first output switch, connected to the first zero voltage terminal, for changing the first output signal such that the first output signal has a positive polarity, and a second output switch, connected to the second zero voltage terminal, for changing the second output signal such that the second output signal has a negative polarity.

26. The power supply circuit set forth in claim 23, wherein:

the resonant element comprises a first resonant circuit for providing a first periodic signal and a second resonant circuit for providing a second periodic signal;

the input switch means comprises a first input switch for producing a first resonant voltage in response to the first periodic signal and a second input switch for producing a second resonant voltage in response to the second periodic signal;

the voltage multiplier rectifier means comprises a first voltage multiplier rectifier circuit including a first capacitor and a first diode, the first diode having a first zero voltage terminal, for rectifying the first resonant voltage to provide a first output signal, and a second voltage multiplier rectifier circuit including a second capacitor and a second diode, the second diode having a second zero voltage terminal, for rectifying the second resonant voltage to provide a second output signal;

the output switch means comprises a first output switch, connected to the first zero voltage terminal, for changing the first output signal such that the first output signal has a positive polarity, and a second output switch, connected to the second zero voltage terminal, for changing the second output signal such that the second output signal has a negative polarity; and the power supply circuit further comprises an output terminal means for providing a wired-or combination of the first output signal and the second output signal.

27. The power supply circuit of claim 26, further comprising a first Zener diode connected in parallel with the first input switch for setting a first peak resonant voltage and a second Zener diode connected in parallel with the second input switch for setting a second peak resonant voltage.

* * * * *